United States Patent
Shrader et al.

(10) Patent No.: US 7,054,968 B2
(45) Date of Patent: May 30, 2006

(54) METHOD AND APPARATUS FOR MULTI-PORT MEMORY CONTROLLER

(75) Inventors: Steven Shrader, Boise, ID (US); Wendy Bishop, Austin, TX (US); Ashwin Matta, Round Rock, TX (US)

(73) Assignee: Denali Software, Inc., Palo Alto, CA (US)

( * ) Notice: Subject to any disclaimer, the term of this patent is extended or adjusted under 35 U.S.C. 154(b) by 238 days.

(21) Appl. No.: 10/663,328

(22) Filed: Sep. 16, 2003

(65) Prior Publication Data

US 2005/0060456 A1  Mar. 17, 2005

(51) Int. Cl.
G06F 13/42 (2006.01)
G06F 12/00 (2006.01)
H04J 1/16 (2006.01)
H04L 12/26 (2006.01)

(52) U.S. Cl. ............... 710/105; 710/18; 711/151; 711/152; 370/232

(58) Field of Classification Search ............... None
See application file for complete search history.

(56) References Cited

U.S. PATENT DOCUMENTS

| | | | | |
|---|---|---|---|---|
| 5,740,380 A * | 4/1998 | LaBerge et al. | ............ | 710/107 |
| 5,953,685 A * | 9/1999 | Bogin et al. | ............ | 702/136 |
| 6,028,841 A * | 2/2000 | Lyon et al. | ............ | 370/232 |
| 6,035,360 A * | 3/2000 | Doidge et al. | ............ | 710/107 |
| 6,092,186 A * | 7/2000 | Betker et al. | ............ | 712/233 |
| 6,178,475 B1 * | 1/2001 | O'Brien | ............ | 710/116 |
| 6,199,127 B1 * | 3/2001 | Ajanovic | ............ | 710/100 |
| 6,324,616 B1 * | 11/2001 | Chrysos et al. | ............ | 710/244 |
| 6,363,445 B1 * | 3/2002 | Jeddeloh | ............ | 710/113 |
| 6,381,649 B1 * | 4/2002 | Carlson | ............ | 709/235 |
| 6,470,238 B1 * | 10/2002 | Nizar et al. | ............ | 700/299 |
| 6,507,530 B1 * | 1/2003 | Williams et al. | ............ | 365/226 |
| 6,651,124 B1 * | 11/2003 | McAllister | ............ | 710/240 |
| 6,654,833 B1 * | 11/2003 | LaBerge | ............ | 710/107 |
| 6,662,278 B1 * | 12/2003 | Kahn et al. | ............ | 711/154 |
| 6,735,653 B1 * | 5/2004 | O Mathuna et al. | ............ | 710/105 |
| 6,741,096 B1 * | 5/2004 | Moss | ............ | 326/37 |
| 6,742,064 B1 * | 5/2004 | Waldie et al. | ............ | 710/124 |
| 6,772,352 B1 * | 8/2004 | Williams et al. | ............ | 713/300 |
| 6,784,890 B1 * | 8/2004 | Bergeson et al. | ............ | 345/535 |
| 6,799,276 B1 * | 9/2004 | Belissent | ............ | 726/14 |
| 6,820,152 B1 * | 11/2004 | Kanzaki et al. | ............ | 710/244 |
| 2002/0062415 A1 * | 5/2002 | Wang et al. | ............ | 710/240 |
| 2002/0116562 A1 * | 8/2002 | Mathuna et al. | ............ | 710/105 |
| 2003/0172213 A1 * | 9/2003 | Garcia et al. | ............ | 710/113 |
| 2005/0060452 A1 * | 3/2005 | Rengarajan | ............ | 710/107 |

* cited by examiner

Primary Examiner—Paul R. Myers
Assistant Examiner—Ryan Stiglic
(74) Attorney, Agent, or Firm—Patent Venture Group (57) ABSTRACT

A memory controller is provided. The memory controller includes an initiator block configured to arbitrate requests corresponding to data from multiple ports. The initiator block includes an arbitration module configured to consider a latency factor and a bandwidth factor associated with the data from a port to be selected for processing. A state machine is in communication with the arbitration module. The state machine is configured to generate a signal to the arbitration module that is configured to select the data associated with the port based upon the latency factor and the bandwidth factor. Task status and completion circuitry configured to calculate the bandwidth factor based upon previous data selected from the port is included in the initiator block. The task status and completion circuitry is further configured to transmit the calculated bandwidth factor to the state machine. A method for arbitrating across multiple ports is also provided.

16 Claims, 9 Drawing Sheets

METHOD AND APPARATUS FOR MULTI-PORT MEMORY CONTROLLER

BACKGROUND OF THE INVENTION

1. Field of the Invention

This invention relates generally to computer systems and more particularly to a method and apparatus for moving data through multi-port systems, e.g., multi-port memory controllers.

2. Description of the Related Art

Figure 1:
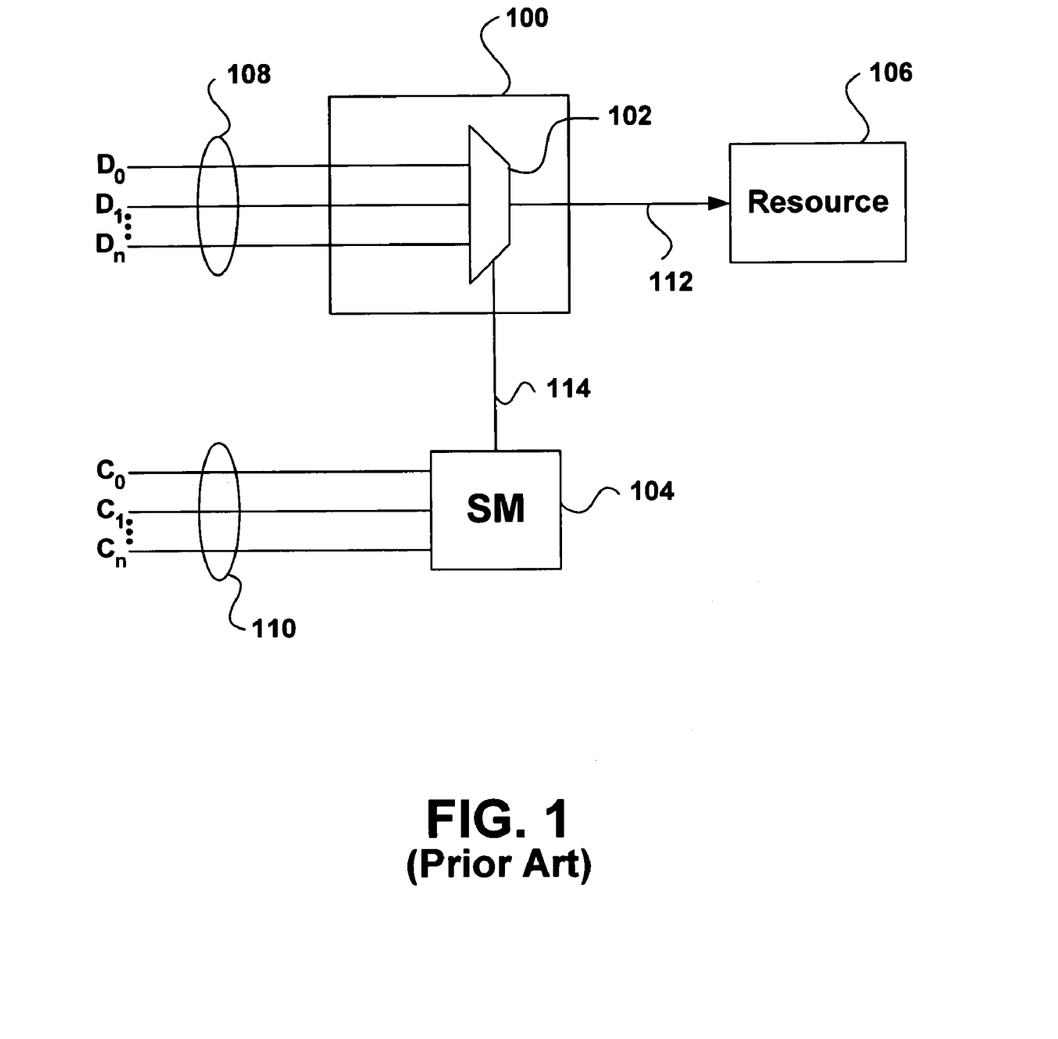
FIG. 1 is a simplified schematic diagram of an arbitration scheme for moving data in a multi-port environment.

Memory systems are the primary bottleneck for the flow of data especially within system-on-chip (SoC) designs. Single chips are now designed to achieve the functionality previously completed through multiple chips. The memory systems associated with the SoC designs must arbitrate multiple ports to get to a single interface, i.e., perform n to 1 port arbitration. The memory controllers associated with the memory systems generally utilize static arbitration. Here, at the time the system is built, the arbitration to be applied to any pattern or incoming request is known. FIG. 1 is a simplified schematic diagram of an arbitration scheme for moving data in a multi-port environment. Data from multiple ports is transmitted over data lines $D_0$–$D_n$ 108 to multiplexer 102 of arbitration unit 100. A select signal generated by state machine 104 is transmitted to multiplexer 102 over select line 114. State machine 104 receives command signals over command lines $C_0$–$C_n$ 110, which correspond to data lines $D_0$–$D_n$ 108, respectively. Based on the command signals, state machine 104 applies a simple rule to determine which data line is selected so that the associated data is transferred to resource 106.

The arbitration decision is typically based upon a fairness algorithm that determines which data is selected. Under fairness algorithms, the state machine generally only takes into account recent past cycles, e.g., if the requester was selected in the last cycle, that requestor is not allowed to be selected for the current cycle. That is, a round robin technique is applied by the state machine which is not based upon any of the knowledge of the characteristics of the data being transferred, such as for example, the amount of data being transferred, how fast the transfers are coming in, etc. In essence, the arbitration is separated into two domains, the data and the requests, wherein the decision of which data to select is only based on data associated with the request domain. Consequently, one of the shortcomings of this type of arbitration is the lack of consideration of bandwidth available and the amount of data being transferred per request.

As a result, there is a need to solve the problems of the prior art to provide a memory system configured to provide feedback for the selection decision of the arbitration scheme, wherein the selection decision considers characteristics of the data.

SUMMARY OF THE INVENTION

Broadly speaking, the present invention fills these needs by providing a feedback mechanism so that the arbitration decision may be based on data characteristics in conjunction with fairness factors. It should be appreciated that the present invention can be implemented in numerous ways, including as a process, a system, or a device. Several inventive embodiments of the present invention are described below.

In one embodiment, a method for arbitrating across multiple ports is provided. The method initiates with assigning a bandwidth limit over a time period to a port associated with a multi-port controller. Then, data is received over the port from a requester. Next, an amount of bandwidth a requestor has previously used is determined. Then, the amount of bandwidth is compared to the bandwidth limit. If the amount of bandwidth is greater than the bandwidth limit, then access to the port is denied for the period.

In another embodiment, a memory controller is provided. The memory controller includes an initiator block configured to arbitrate requests corresponding to data from multiple ports. The initiator block includes an arbitration module configured to consider both a latency factor and a bandwidth factor associated with the data from a port to be selected for processing. A state machine in communication with the arbitration module is included in the initiator block. The state machine is configured to generate a signal to the arbitration module. The signal is configured to select the data associated with the port based upon both the latency factor and the bandwidth factor. Task status and completion circuitry configured to calculate the bandwidth factor based upon previous data selected from the port is included in the initiator block. The task status and completion circuitry is further configured to transmit the calculated bandwidth factor to the state machine.

In yet another embodiment, a system is provided. The system includes a memory controller configured to accommodate a multi-port design. The memory controller includes an initiator block configured to arbitrate multiple requests for access to the system. The initiator block includes circuitry configured to define a statistics window and circuitry configured to define a reporting window. The reporting window is a segment of the statistics window. The circuitry configured to define a statistics window and the circuitry configured to define a reporting window are further configured to determine a number of cycles that commands for a port are active in the memory controller over a specified number of cycles. Each port in the system may be configured to have a different statistics and reporting window and still operate seamlessly in the entire system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for optimizing the arbitration of data through a multi-port memory controller. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments of the present invention provide a memory controller and an arbitration scheme for moving data in a reactive manner relative to the characteristics of the data. It should be appreciated that the reactive manner is in contrast to a predictive scheme that considers a frequency of usage of the originator of the data and not the data characteristics. In essence, the embodiments described below are configured to understand the bandwidth available and the amount of data being transferred per request to provide a deeper view of the data movement process. Thus, data characteristics in addition to fairness attributes may be factored into the arbitration scheme to provide a more effective manner of moving the data.

Figure 2:
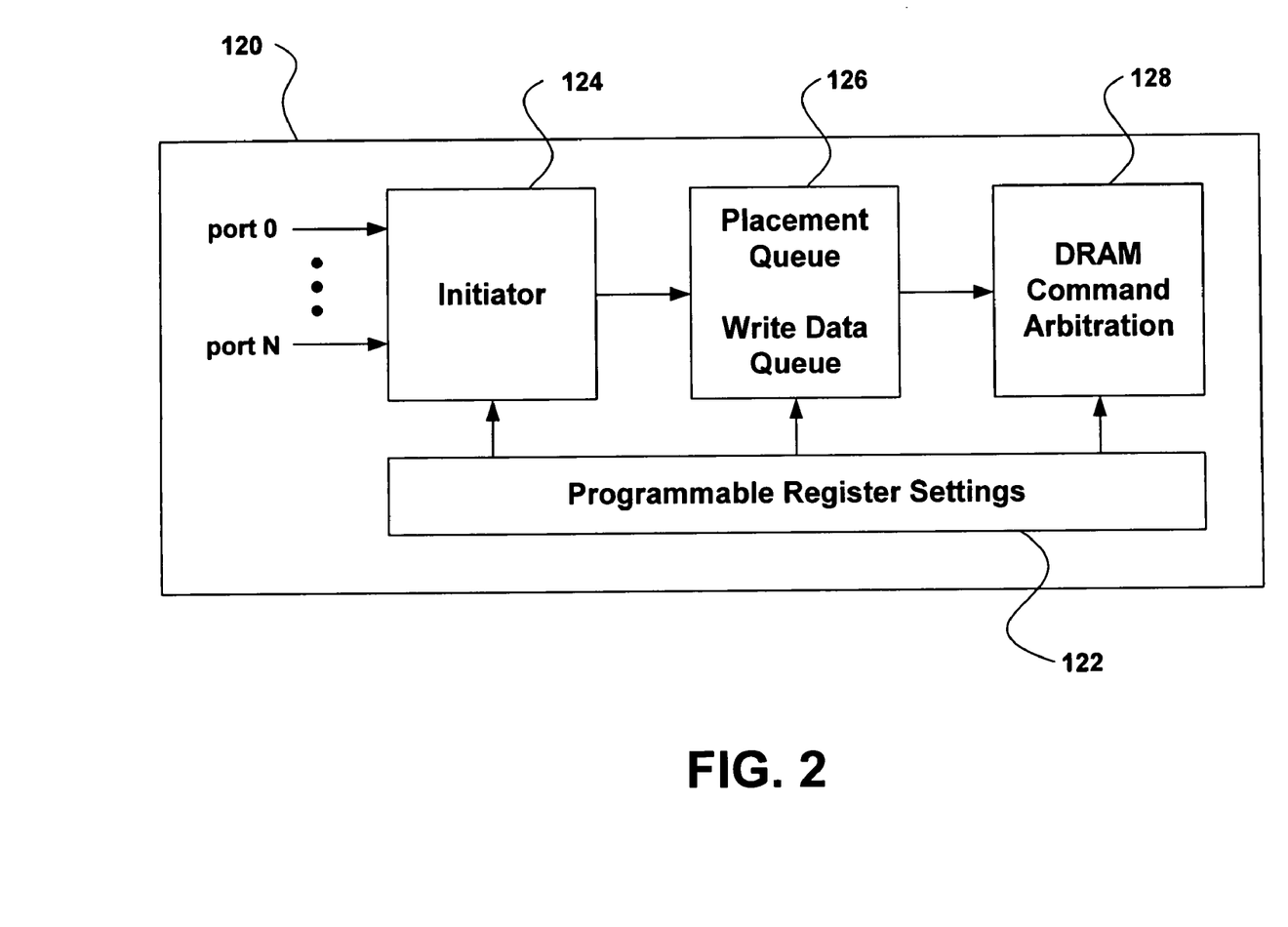
FIG. 2 is a high-level schematic diagram of the components of a multi-port memory controller in accordance with one embodiment of the invention.

FIG. 2 is a high-level schematic diagram of the components of a multi-port memory controller in accordance with one embodiment of the invention. Memory controller 120 includes initiator block 124, placement queue and write data queue block 126, and dynamic random access memory (DRAM) command arbitration block 128. Programmable register settings block 122, which is in communication with initiator block 124, placement queue and write data queue block 126, and DRAM command arbitration block 128 is also included. Initiator block 124 is configured to receive data from port zero through port N. The embodiments described herein focus on the configuration of initiator block 124. It should be appreciated that the architecture of the multi-port memory controller is based on the need for high memory bandwidth utilization and efficient arbitration for a high priority request to reduce latency of these requests. Initiator block 124 is configured to arbitrate requests from the multiple ports through a feedback loop that enables the consideration of past bandwidth usage of each of the ports, that may be in addition to fairness considerations.

It should be appreciated that the architecture defined through FIG. 2 allows for any arbitration scheme to be implemented, and is not limited to the arbitration schemes provided as examples herein. In one embodiment, each of ports zero through port N is assigned a bandwidth requirement along with a priority. These values may be stored as programmable registers in programmable register setting block 122 and written upon initialization of memory controller 120 after reset. In another embodiment, the bandwidth requirement is defined as the maximum percentage bandwidth the port will be allowed to have. Once this level is exceeded, initiator block 124 is configured to no longer accept requests from the corresponding port until the bandwidth levels drop below a predefined threshold. In one embodiment, the priority of the port, along with the port arbitration logic, determines which ports are allowed to register a request to placement queue and write data queue block 126.

Figure 3:
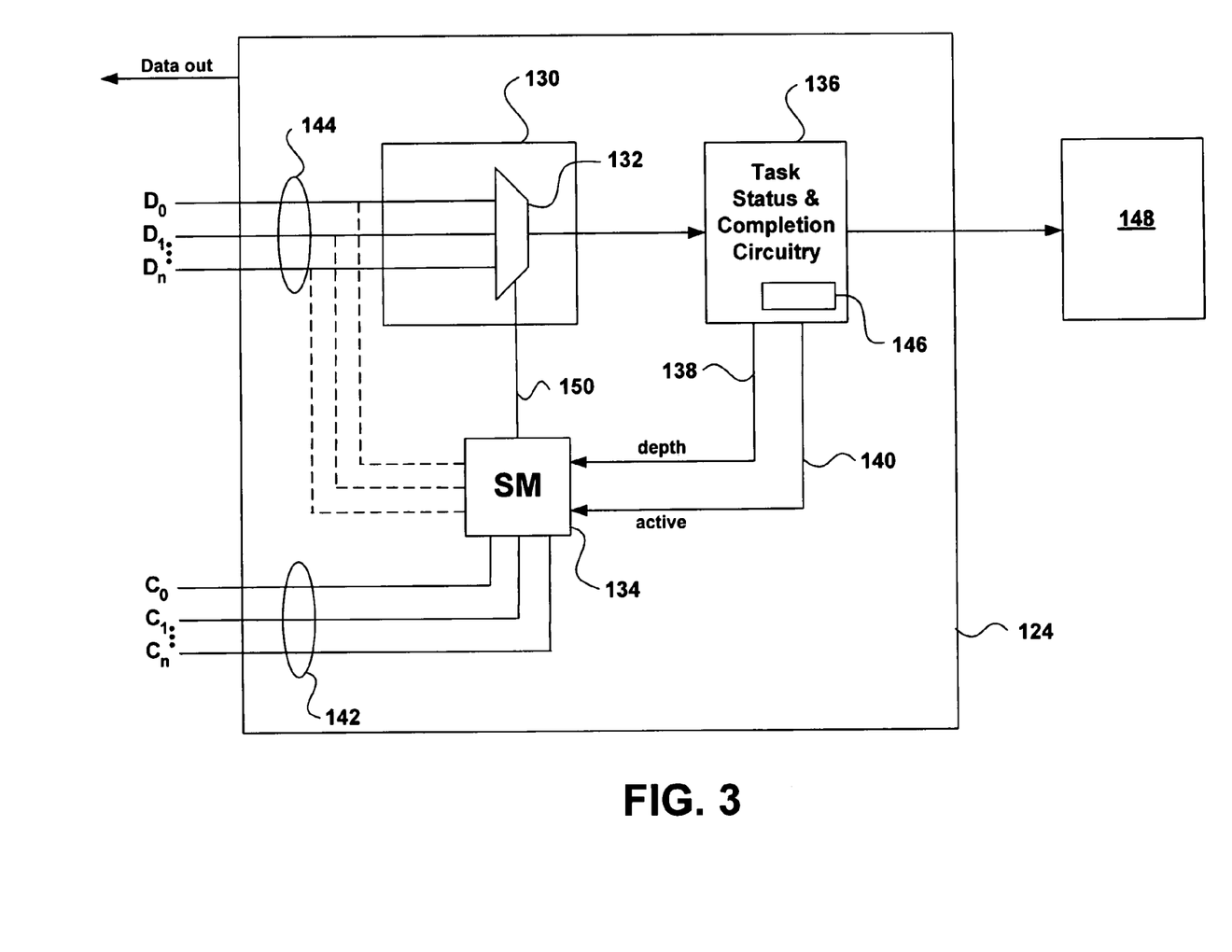
FIG. 3 is a more detailed schematic diagram of the components of the initiator block of FIG. 2.

FIG. 3 is a more detailed schematic diagram of the components of the initiator block of FIG. 2. Initiator block 124 includes arbitration module 130, which includes multiplexer (mux) 132, state machine 134, and task status and completion circuitry 136. Task status and completion circuitry 136 includes queue 146. It should be appreciated that data lines $D_0$ through $D_n$ 144 transmit data to arbitrator 130, while corresponding command lines $C_0$ through $C_n$ 142 transmit commands to state machine 134. The data and corresponding commands originate from the same source. Multiplexer 132 is configured to determine the data which is allowed to pass according to a select signal transmitted over select line 150 and originating from state machine 134. Task status and completion circuitry 136 enables feedback to state machine 134 through depth signal 138 and active signal 140. Through the feedback provided by task status and completion circuitry 136, the amount of bandwidth used for a particular port relative to the corresponding requester, and the number of total outstanding requests for all ports, is captured in order for state machine 134 to update the bandwidth used by each requestor. This bandwidth indication combines both time spent transferring data as well as any overhead required to setup the memory devices for the transfer. In this way, every cycle in the system is allocated to a particular requester. The state machine circuitry in 134 can also make decisions based upon the overall status of the system. In one embodiment, if the system is not stressed at a certain time, the bandwidth allocation rules can be relaxed without adversely affecting the overall performance of the system. In essence, state machine 134 is being provided knowledge on the data coming in over data lines $D_0$ through $D_n$ 144 rather than just seeing the requests from respective command lines $C_0$ through $C_n$ 142. Accordingly, arbitration module 130 may now take a view of bandwidth factors in addition to fairness factors. Thus, the dotted lines into state machine 134 from respective data lines 144 represent that the state machine is now considering the characteristics of the data in addition to the requestor of the data in the generation of the select signal.

Still referring to FIG. 3, task status and completion circuitry 136 is configured to deliver the data output from mux 132 to resource 148. In one embodiment, resource 148 is placement queue and write data queue block 126 with reference to FIG. 2. However, it should be appreciated that resource 148 may be any suitable receiver of the data selected through arbitration module 130, e.g., memory structure, serial port, video board, or other suitable receiver of data, etc. It should be further appreciated that task status and completion circuitry 136 enables feedback to arbitration module 130 on the status of data transferred from the arbitration module, thereby enabling the arbitration scheme to be reactive or adaptive rather than predictive. In one embodiment, the period of time that task status and completion circuitry 136 is working on the data, or a task associated with the data, is translated back into the decision making process for determining which data from the multiple ports to be selected.

Figure 4A:
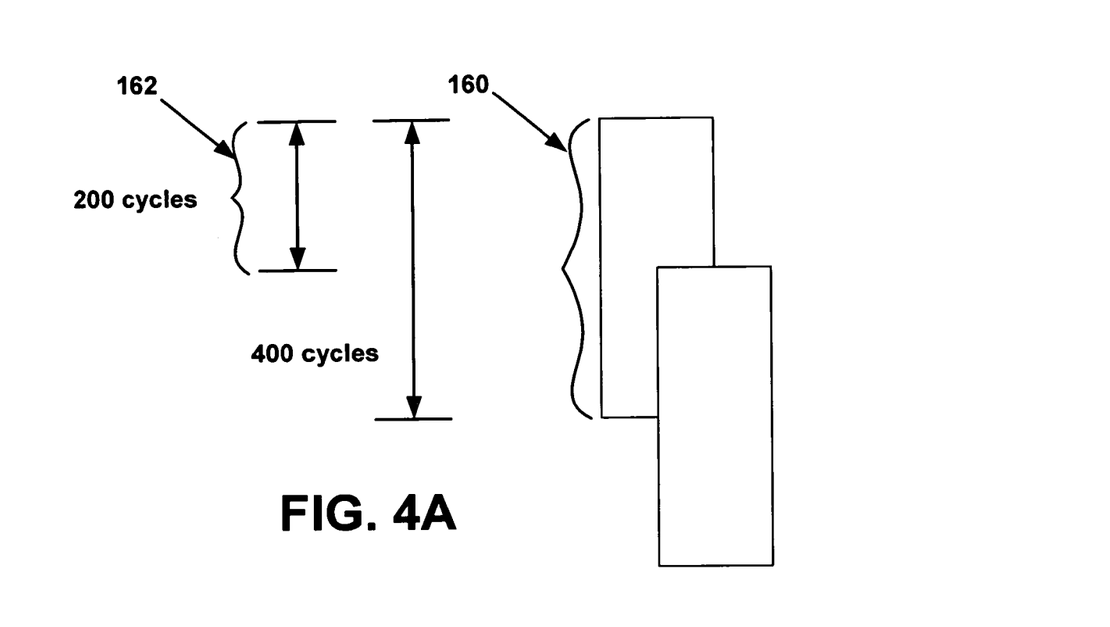
FIGS. 4A and 4B represent a pictorial illustration of a configuration of a bandwidth allocation module in accordance with one embodiment of the invention.
Figure 4B:
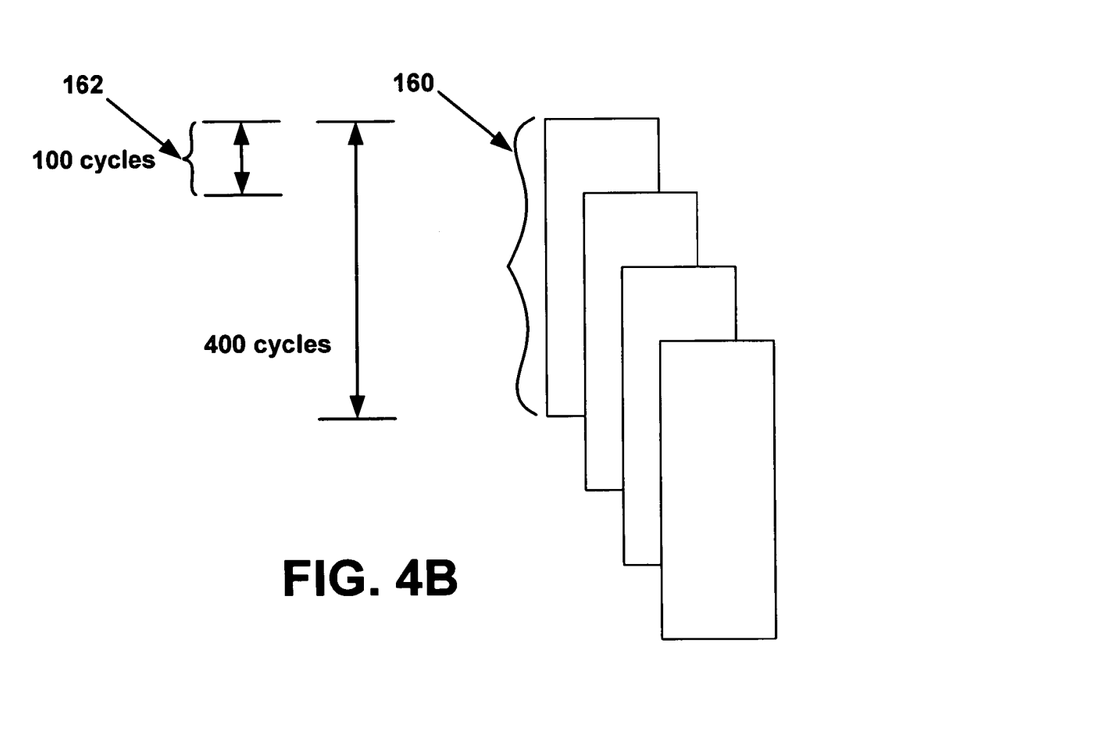

FIGS. 4A and 4B represent a pictorial illustration of a configuration of a bandwidth allocation module in accordance with one embodiment of the invention. The bandwidth arbitration example is part of the logic in state machine 134.

The bandwidth allocation module represented by FIGS. 4A and 4B provides for the determination of how much bandwidth a requester has consumed over a period of time, in addition to looking at the number of times a requestor has accessed a channel or port. In FIG. 4A, a port's bandwidth statistics are accumulated over a statistics window 160 of 400 cycles. The actual bandwidth used is reported every 200 cycles as defined by reporting window 162. Consequently, this means that once the bandwidth for a particular 400 cycle window exceeds the allotted bandwidth, the initiator will suppress requests from this port for at least 200 cycles and a maximum of 400 cycles. It should be appreciated that bandwidth statistics are generated by statistic modules that count the number of cycles the commands for a corresponding port are active in the controller over a specified number of cycles, as discussed with reference to FIG. 7. This time (the specified number of cycles) is called the statistics window. The counters are reset every statistic window in a staggered fashion every reporting window cycles such that each statistics counter is reset every statistic window number of cycles.

FIG. 4B illustrates a bandwidth statistics generated for a 400 cycle window but reported every 100 cycles. Accordingly, this configuration results in a minimum suppression time of 100 cycles and a maximum of 400 cycles. In comparing FIG. 4A to FIG. 4B, it should be appreciated that FIG. 4A limits the bandwidth allocation percentages to a granularity of 50%, while FIG. 4B allows for 25% granularity. Of course, this assumes that each transaction maximum length is less than or equal to the 200 and 100 cycles, respectively. For example, assume a port has 50% guaranteed bandwidth in the configurations for both FIGS. 4A and 4B. If the port used all of its 50% of bandwidth in a bursting nature that coincided with the beginning of a statistic's window, and in the previous 600 cycles there was no activity on this port, then the port would have to wait 400 cycles with reference to FIG. 4A before it could possibly be granted again. The port would have to wait 200 cycles with reference to FIG. 4B before it could possibly be granted again. Accordingly, the configuration of the statistics generator module influences the maximum latency of requests and the guaranteed bandwidth granularity that the system can maintain over time as illustrated above in the comparison of FIGS. 4A and 4B.

The depth of the statistics window may be determined after the granularity has been established by knowing minima of the largest request size for the lowest overall bandwidth port. For example, with reference to FIGS. 4A and 4B, if the lowest overall bandwidth port is port D with 5% and the maximum request port D may issue is for eight words, then the statistics window needs to be 8/5% which equals 160 cycles. Accordingly, this would result in a minimum statistic module that has a statistics window of 160 and a statistics reporting cycle of 8. It should be appreciated that the depth of the statistics window corresponds to a number of columns within each of exemplary FIGS. 4A and 4B. That is, FIG. 4A includes two columns while FIG. 4B includes four columns, therefore, FIG. 4B has a higher depth associated with it relative to FIG. 4A. In turn, the granularity achieved by FIG. 4B is finer than the granularity of FIG. 4A.

Figure 5A:
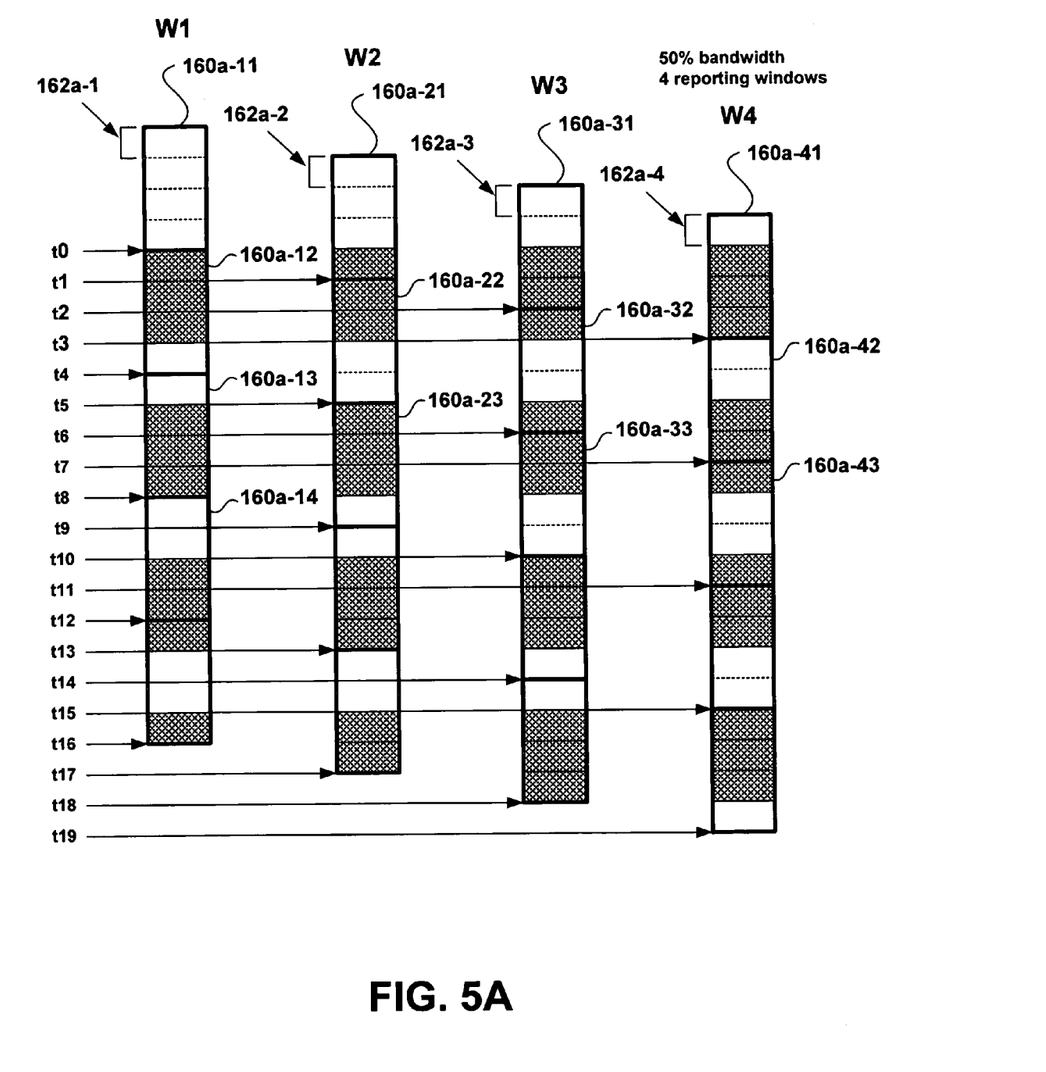
FIG. 5A is a schematic diagram illustrating an implementation of the arbitration scheme taking into account the bandwidth consumed by a requester over time in accordance with one embodiment of the invention.

FIG. 5A is a schematic diagram illustrating an implementation of the arbitration scheme taking into account the bandwidth consumed by a requester over time in accordance with one embodiment of the invention. For exemplary purposes, reporting windows 162a-1 through 162a-4 are made up of 10 cycles, while statistics windows 160a-11 through 160a-43 are defined as 40 cycles (4 sets of reporting windows). Thus, this configuration will provide for the reporting of the bandwidth of the port every 10 cycles. Furthermore, the statistics window is defined such that the maximum bandwidth, i.e., bandwidth limit, of statistics window 160 that any requester may use is 50%. That is, once 50% bandwidth is exceeded, then access for the port is suspended for a period of time until the bandwidth allocation is reduced to 50% or below.

Still referring to FIG. 5A, at time point t0, statistic window 160a-11 illustrates that the corresponding requestor did not use the port so access to the port is allowed. At time point $t_1$, statistic window 160a-21 illustrates that the requester has consumed 25% of the bandwidth. Access is allowed here as the bandwidth consumed is less than the bandwidth ceiling of 50%. At time point $t_2$, statistic window 160a-31 illustrates that the requester has consumed 50% of the bandwidth. Access is again allowed here as the bandwidth consumed is equal to the bandwidth ceiling of 50%. At time point $t_3$, statistic window 160a-41 illustrates that the requester has consumed 75% of the bandwidth. Here, access is denied after $t_3$ as the bandwidth consumed has exceeded the bandwidth ceiling. At time period $t_4$, statistic window 160a-12 illustrates that the requester has consumed 75% of the bandwidth. Here, again access is denied after $t_4$ as the bandwidth consumed has exceeded the bandwidth ceiling. At time period $t_5$, statistic window 160a-22 illustrates that the requester has consumed 50% of the bandwidth. Thus, access is allowed after $t_5$. At time period $t_6$, statistic window 160a-32 illustrates that the requester has consumed 50% of the bandwidth. Here again, access is allowed after $t_6$. At time period $t_7$, statistic window 160a-42 illustrates that the requester has consumed 50% of the bandwidth. Here again, access is allowed after $t_7$. At time period $t_8$, statistic window 160a-13 illustrates that the requester has consumed 75% of the bandwidth. Thus, access is denied after time period $t_8$. This pattern continues to repeat as described above.

Figure 5B:
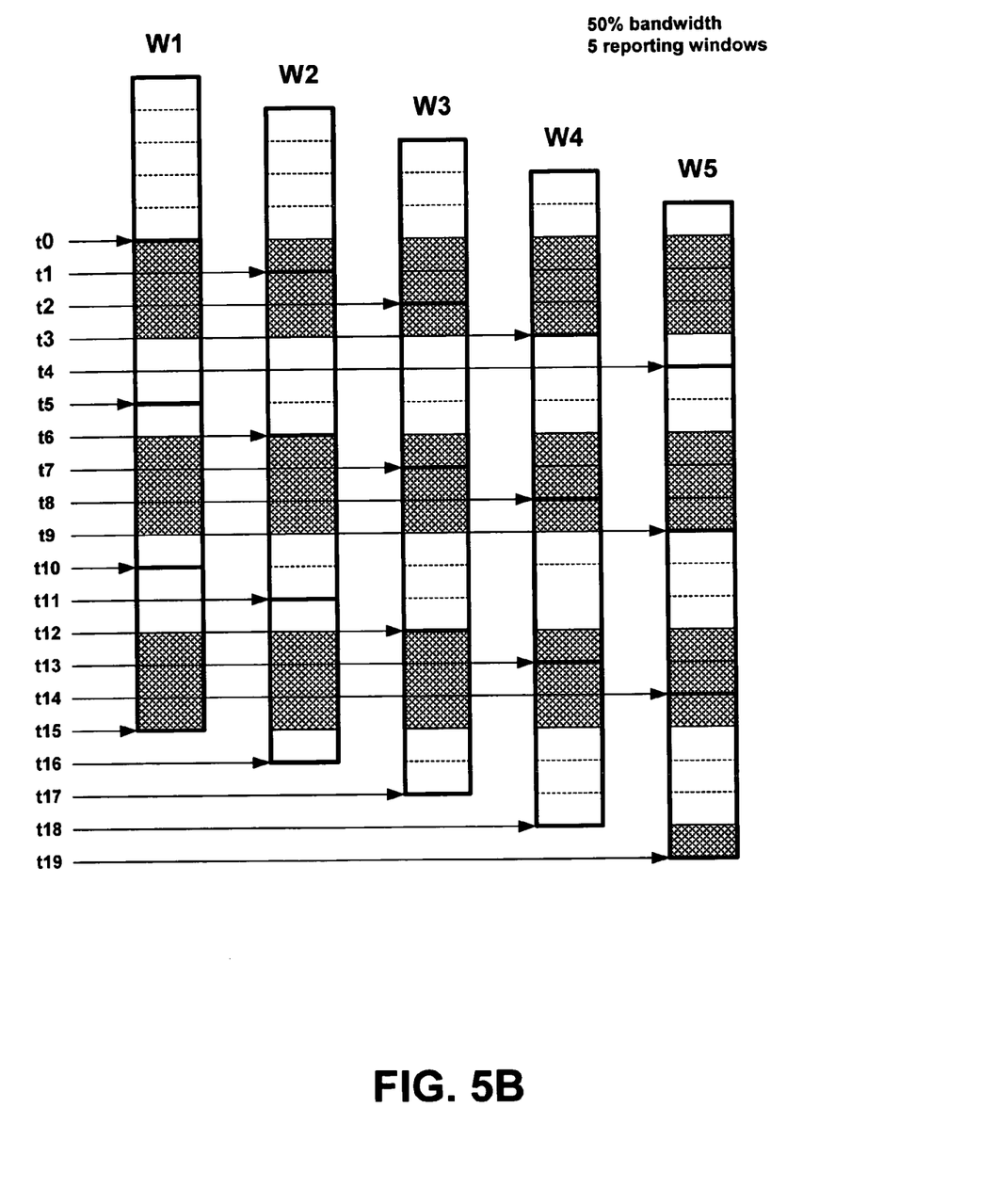
FIG. 5B is an alternative to the embodiment of FIG. 5A.

It should be appreciated that the more columns considered, the finer the granularity achieved. That is, the oscillating nature of the bandwidth cycles is smoothed as illustrated below with reference to FIG. 6. FIG. 5B is an alternative to the embodiment of FIG. 5A. In FIG. 5B there are 5 reporting windows, rather than 4 as shown in FIG. 5A. As can be seen the bandwidth oscillates between 50% and 60% in FIG. 5B, as opposed to 50% and 75% as shown in FIG. 5A. Thus, the extra reporting window allows for finer granularity in the control of the bandwidth for the port. It should be appreciated that FIGS. 5A and 5B are exemplary Figures and not meant to be restrictive. That is any suitable number of reporting windows, cycles per reporting window, and statistics windows may be used depending on the application.

Figure 6:
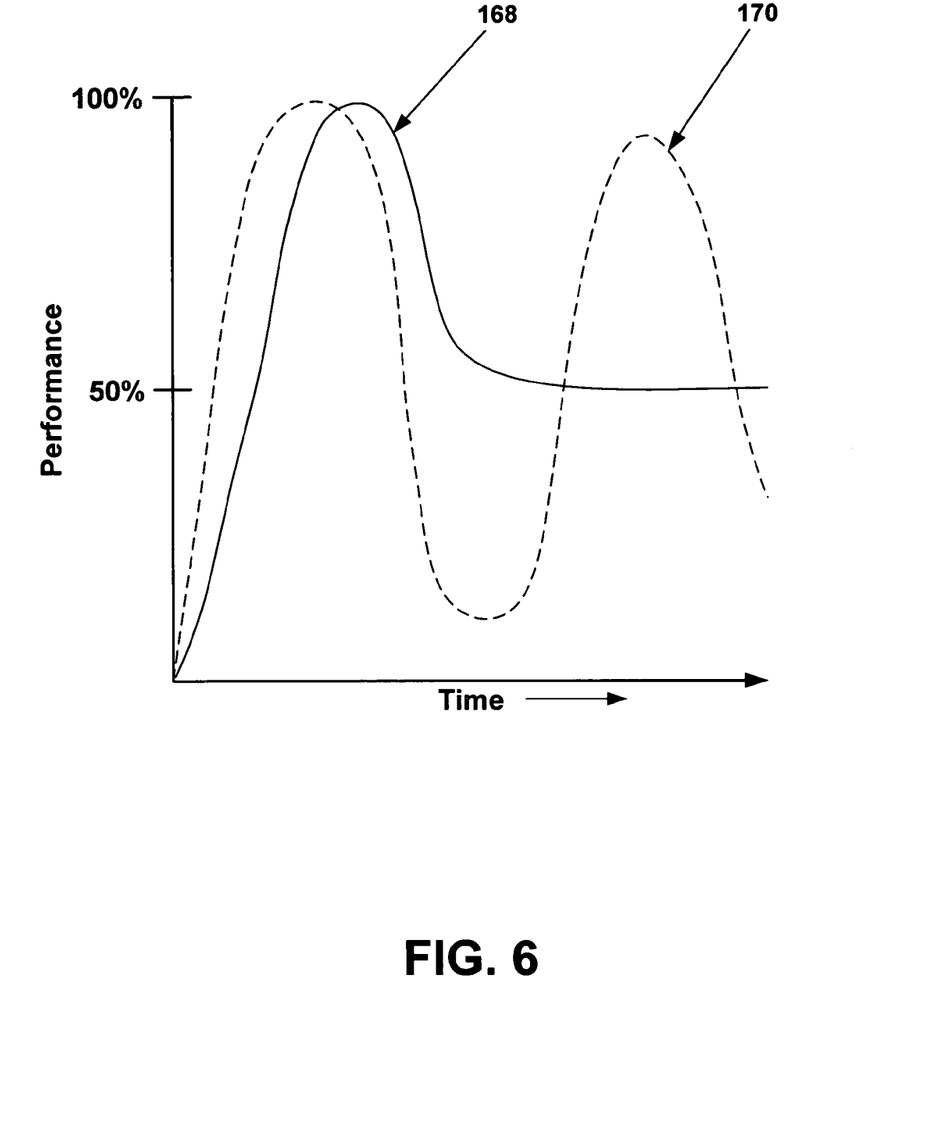
FIG. 6 is an exemplary graph illustrating the effect of granularity on the performance in accordance with one embodiment of the invention.

FIG. 6 is an exemplary graph illustrating the effect of granularity on the performance in accordance with one embodiment of the invention. Here, line 168 represents a system where the reporting window samples at each point in time (perfect granularity), in essence calculating the integral. Line 170 represents the oscillation achieved when the granularity becomes more coarse. As can be seen, the perturbations oscillate between peak data transfer time points and data transfer time points when there is essentially no data transfer. The embodiments described herein allow for a balance to be achieved between the latency and the bandwidth by allowing for the adjustment of the reporting window and the statistics window by a user.

Referring back to FIGS. 5A and 5B, it should be appreciated that a single column will balance the burstiness (bandwidth), while the number of columns balance spottiness (latency). For example, if only a single column was represented, applying the same bandwidth ceiling (50%), it should be appreciated that the latency will be increased. That is, the access for the port would be turned off after $t_3$ and not turned back on until $t_9$, instead of $t_6$. Thus, the time between the time period associated with the last request allowing access and the time period associated with the next request allowing access, i.e., the latency, is greater as the number of columns decreases, i.e., the depth decreases. As illustrated in FIG. 5A, the bandwidth oscillated between 50% and 75%, while an arbitration technique not considering the characteristics of the data as described herein will oscillate between 0 and 75%.

One skilled in the art will appreciate that the quality of service required by a requester is accommodated through this technique irrespective of whether the requestor is bursty or spotty. For example, with reference to Voice over Internet Protocol (VoIP), which may be considered spotty, where each time period a packet must get sent out, the embodiments described herein provide for the guarantee that the necessary bandwidth will be provided. Furthermore, for the system-on-chip design, where everything is on one chip, e.g., VoIP, video, etc., demands for the need to balance the latency aspects and the bandwidth aspects. Exemplary applications now demanding this balance include cell phone applications, interactive set top boxes, etc.

Figure 7:
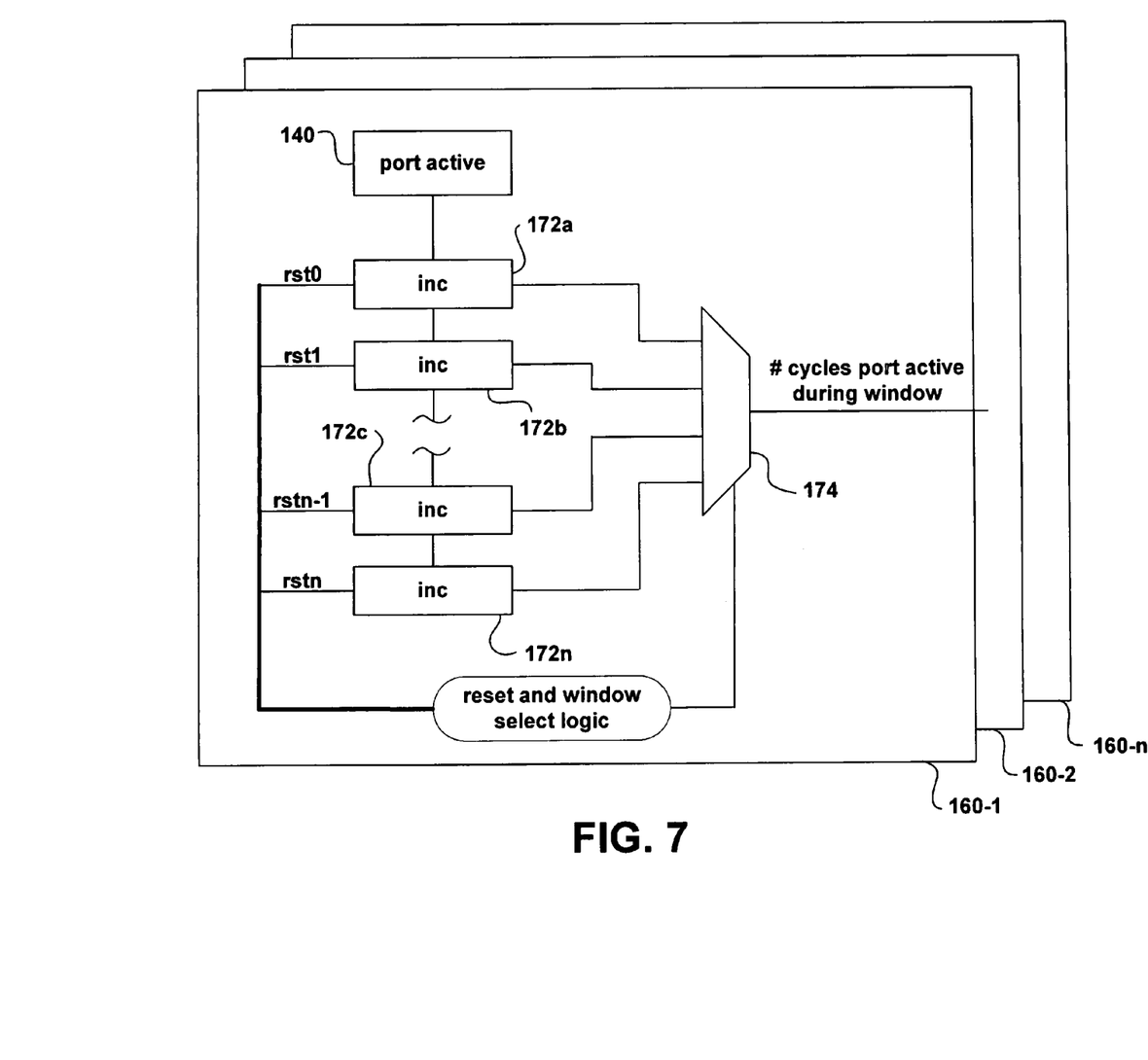
FIG. 7 is a simplified schematic representing a hardware implementation of a statistics window in accordance with one embodiment of the invention.

FIG. 7 is a simplified schematic representing a hardware implementation of a statistics window in accordance with one embodiment of the invention. It should be appreciated that FIG. 7 represents the hardware configuration associated with a single statistics window 160-1. The hardware configuration sits inside task status and completion circuitry 136 with reference to FIG. 3. The implementation of the statistics calculator, which generates the bandwidth statistics, consists of a series of counters 172a–172n, also referred to as adders or incrementers, for each port. Each group of counters 172a–172n receives a signal 140 from the memory controller that indicates that the controller is currently executing an instruction for that port. All counters 172a–172n are incremented by one when this signal is active. The outputs of each of the counters are multiplexed together through multiplexer 174. A select signal for multiplexer 174 is rotated through each counter 172a–172n on a periodic basis. In one embodiment, the period of the mux select change or rotation cycle is equal to the size of the counter divided by the number of counters. Additionally, each counter is reset to zero in a staggered fashion every $2^N$ cycles, where N is the size of the counter in bits. Due to this configuration, the output of multiplexer 174 is an indication of the bandwidth utilization for the port over some discrete time frame.

As each of the resets for the counters 172a–172n are staggered in time, the width of each counter, i.e., how many bits are in the counter, represents the statistics window discussed above. The number of counters 172a–172n used to define statistics window 160-1 represents the reporting widow. It should be appreciated that the hardware configuration of statistics window 160-1 is replicated a number of times as represented by blocks 160-2 through 160-n to provide the desired granularity. That is, the number of columns with reference to FIGS. 5A and 5B, corresponds to the number of replications of statistics window 160-1 through 160-n. It should be appreciated that the more columns defined, i.e., more replications of the statistics window, allows for finer granularity. In one embodiment, the number of counters 172a–172n and replications is configurable so that a user may optimize the configuration for a particular design or application characteristics.

Table 1 illustrates the initiator register settings with reference to block 122 of FIG. 2.

TABLE 1

| Register | Description |
| --- | --- |
| Priority[N:0] | N = max number of priority assignments. 1 is the highest priority. 0 is RESERVED.<br>0 = 1 level(1)<br>1 = 3 levels(1, 2, 3)<br>2 = 7 levels(1, 2, 3, 4, 5, 6, 7) |
| Bdw[M:0] | The bandwidth ceiling, in number of cycles within the statistics window, that port X is allowed to consume before the bandwidth allocation throttle is engaged.<br>M = 2log(size of the statistics window) |
| Bdw_Ovflow | 0 = Do not allow port access to the controller when its bandwidth allocation is exceeded even if the controller can accept the command.<br>1 = Allow a port to exceed bandwidth percentage if the controller command queue is less than ½ full and no other requestors that have not exceeded their bandwidth allocation are requesting. | x = Port number. This is configurable up the maximum number of ports configured

In one embodiment, a port is allowed to exceed a bandwidth ceiling or requirement assigned to the port under certain conditions. One condition is where queue 146 with reference to FIG. 3 is below a certain level that indicates the system is not stressed for bandwidth, then the requestor may use as much bandwidth as is possible. Another condition is that there are no other active requestors that have exceeded their bandwidth requirements. For example, where the level is 50%, and the queue is only 25% full, a requestor may exceed its bandwidth limit where no other active requestors that have exceeded their bandwidth requirements. In another embodiment, where any of the requestors have exceeded their bandwidth requirements and the queue is less than half full, then a round robin arbitration scheme is employed to allow a request to be sent to the controller from one of the active requestors. Thus, for each port it may be determined whether the port may exceed the bandwidth ceiling through the Bdw_Ovflow register setting. Here, at the end of each statistics window, the percentage of cycles used to transfer data words is compared to Bdw limit. If the bandwidth exceeds this limit, the arbiter will not grant requests from this port for another period of time unless the Bdw_Ovflow bit is enabled. It should be appreciated that this period of time is referred to as the statistics reporting time. Furthermore, the statistics window and the statistics reporting time are both configurable based upon the overall bandwidth required by the ports in the system.

Figure 8:
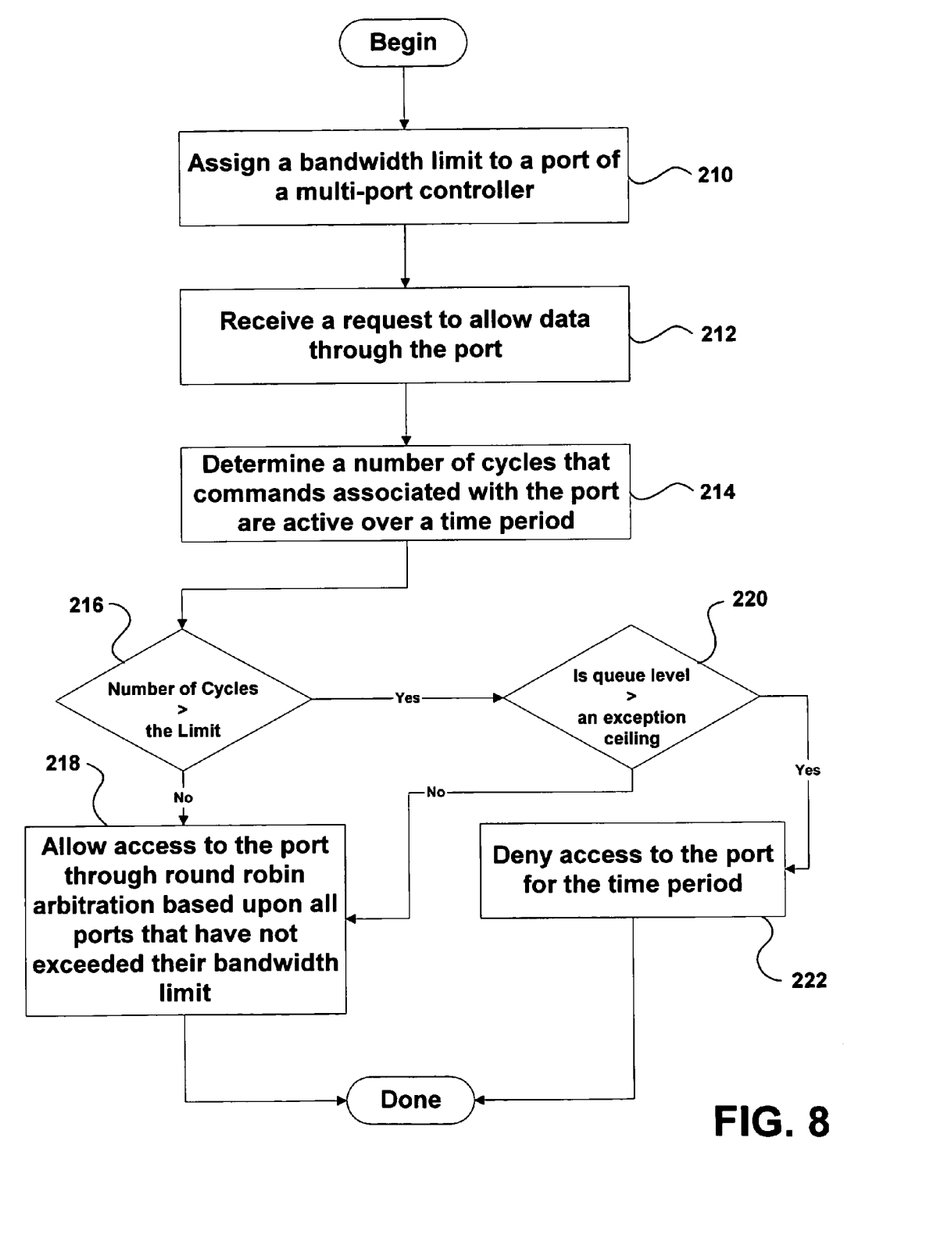
FIG. 8 is a flow chart diagram illustrating the method operations for arbitrating data within a memory controller in accordance with one embodiment of the invention.

FIG. 8 is a flow chart diagram illustrating the method operations for arbitrating data within a memory controller in accordance with one embodiment of the invention. The method initiates with operation 210 where a bandwidth limit, i.e., a bandwidth ceiling, for a port of a multi-port controller is assigned. Here, any suitable bandwidth requirement may be designated by a user, through, for example, a graphical user interface (GUI). The method then advances to operation 212 where a request to allow data through the port is received. Here, the request may be delivered through a command line to a state machine as illustrated with respect to FIG. 3. The method then proceeds to operation 214 where a number of cycles for which commands associated with a port are active over a time period are determined. As discussed above, the number may be generated by a statistics module, e.g., the bandwidth statistics generator module with reference to FIG. 7. Here, the statistics window and the reporting window discussed above are configured and take into consideration the bandwidth characteristics of the data as well as the frequency of usage of the port.

The method of FIG. 8 then moves to decision operation 216, where it is determined if a number of cycles is greater than the limit. If the number of cycles is not greater than the limit, then the method advances to operation 218 where access to the port is allowed, i.e., the data is selected. If the number of cycles is greater than the limit in decision operation 216, then the method proceeds to decision operation 220. In decision operation 220, it is determined if a queue level is greater than an exception ceiling value. If the queue level is greater than the exception ceiling value, then the method proceeds to operation 222 where access is denied to the port for the time period. If the queue level is not greater than the exception ceiling value, then the method moves from decision operation 220 to operation 218 where access to the port is allowed. In one embodiment, access is determined through round robin arbitration based upon all that have not exceeded their corresponding bandwidths. It should be appreciated that decision operation 220 enables a port to exceed the predefined bandwidth under certain conditions as discussed above. Those conditions include that the controller command queue, i.e., queue 146 with reference to FIG. 3, is less than the exception ceiling value, referred to above as the 50% value for illustrative purposes. This indicates that the entire system is not stressed for bandwidth so that the requester may use as much bandwidth, up to 100% when the system is lightly loaded.

As mentioned above, another condition for allowing a port to exceed its bandwidth limit is that there are no other requestors active that have not exceeded their bandwidth limits. In one embodiment if all requestors have exceeded their bandwidth requirements and the controller command queue is less than half full, a round robin arbitration scheme will be employed to allow a request to be sent to the controller from one of these requestors. It should be appreciated that the arbitration scheme defined herein allows the ports to be configured with a bandwidth ceiling. Furthermore, the actual implementation of the bandwidth statistics generation and checking is configurable. That is, a user may set any suitable limits for the particular purposes that the user desires.

In summary, the embodiments described herein provide a method and apparatus for effectively providing high memory bandwidth utilization and efficient arbitration for high priority requests to reduce latency of these requests. In one embodiment, feedback on the frequency of data from a requestor, as well as feedback on the characteristics of the data, are considered when determining how to arbitrate data received in a multi-port configuration. Through the configuration of counters within circuitry downstream of the arbitrator, the feed back is provided to a state machine, thereby enabling a reactive selection of the data as opposed to a selection simply based upon fairness, e.g., which port had access last. It will be apparent to one skilled in the art that the embodiments described herein may be applied to any system that moves data, e.g., DRAM controller, serial port, direct memory access (DMA) engine and cache fill, etc., and requires an arbitration scheme to move the data. Furthermore, with respect to systems-on-chip configurations, the above described embodiments enable accommodation of the multiple requestors and the competing interests all consolidated on a single chip. As discussed above, a user may configure the arbitration scheme through the parameters associated with the statistics windows and the reporting windows.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for arbitrating across multiple ports, comprising:

defining at least one statistics window having a beginning time and an ending time, wherein the statistics window defines a period of time that bandwidth utilized by a port is recorded;

defining a reporting window that defines a time interval that the statistics window is updated;

assigning a bandwidth limit over the statistics window to a port associated with a multi-port controller;

receiving data over the port from a requestor;

updating the statistics window with an amount of bandwidth the requestor has used during the reporting window;

comparing the amount of bandwidth used during the statistics window to the bandwidth limit;
denying access to the port during the next reporting window if the amount of bandwidth used during the statistics window is greater than the bandwidth limit; and
increasing the beginning time of the statistics window and the ending time of the statistics window by an amount of time equal to the reporting window.

2. The method of claim 1, further comprising:
if the amount of bandwidth used during the statistics window is less than or equal to the bandwidth limit, then the method includes,
allowing access to the port.

3. The method of claim 1, wherein the method operation of updating the statistics window with an amount of bandwidth the requestor has used during the reporting window includes,
determining a number of cycles that commands associated with the port are active over the statistics window.

4. The method of claim 1, wherein the method operation of defining at least one statistics window includes,
defining a plurality of statistics widows, each statistics window having a beginning time and an ending time each offset from other statistics windows by at least one reporting window.

5. The method of claim 4, wherein the method operation of increasing the beginning time of the statistics window and the ending time of the statistics window by an amount of time equal to the reporting window includes,
utilizing a subsequent statistics window from the plurality of statistics windows for the next method operation of comparing the amount of bandwidth used during the statistics window to the bandwidth limit.

6. The method of claim 1, wherein the method operation of updating the statistics window with an amount of bandwidth the requestor has used during the reporting window includes,
incrementing a counter associated with the port when the port is active.

7. A memory controller, comprising:
an initiator block configured to arbitrate requests corresponding to data from multiple ports, the initiator block including,
an arbitration module configured to consider both a latency factor and a bandwidth factor associated with the data from a port to be selected for processing;
a state machine in communication with the arbitration module, the state machine configured to generate a signal to the arbitration module, the signal configured to select the data associated with the port based upon both the latency factor and the bandwidth factor; and
task status and completion circuitry that includes at least one adder associated with each of the multiple ports, wherein a width of the adder determines a statistics window having a beginning time and an end time and a number of adders associated with the port determines a size of a reporting window that defines a time interval that the statistics window is updated, the task status and completion circuitry being configured to calculate the bandwidth factor based upon bandwidth utilized during the statistics window, the task status and completion circuitry further configured to transmit the calculated bandwidth factor to the state machine, the task status and completion circuitry also configured to increment the beginning time and the end time of the statistics window by on reporting window after transmitting the calculated bandwidth factor to the state machine.

8. The memory controller of claim 7, wherein the arbitration module includes a multiplexer, the multiplexer configured to select data from one of the multiple ports.

9. The memory controller of claim 7, wherein the task status and completion circuitry includes,
a queue configured to indicate remaining bandwidth available for a system associated with the memory controller.

10. A system, comprising:
a memory controller configured to accommodate a multi-port design, the memory controller including,
an initiator block configured to arbitrate multiple requests for access to the system, the initiator block including,
circuitry configured to define a statistics window having a beginning time and an end time;
circuitry configured to define a reporting window that defines a time interval that the statistics window is updated, the reporting window being a segment of the statistics window, wherein the circuitry configured to define the statistics window and the circuitry configured to define the reporting window are further configured to determine a number of cycles that commands for a port are active in the memory controller over a specified number of cycles; and
circuitry configured to increment the beginning time and the end time of the statistics window by on reporting window after determine a number of cycles that commands for a port are active.

11. The system of claim 10, wherein the statistics window is a period of time that bandwidth statistics are gathered.

12. The system of claim 10, wherein the reporting window is a period of time between an update of bandwidth statistics.

13. The system of claim 10, further comprising:
a programmable register configured to store a bandwidth requirement value and a priority value.

14. The system of claim 13, wherein an output associated with both the circuitry configured to define a statistics window and the circuitry configured to define a reporting window indicates a bandwidth utilization value for the port.

15. The system of claim 14, further comprising:
circuitry configured to compare the bandwidth utilization value with a bandwidth limit value, wherein if the bandwidth utilization value is greater than the bandwidth limit value, access to the port is denied.

16. The system of claim 10, wherein the memory controller is incorporated into a cellular phone.

* * * * *